US012719676B2

(12) United States Patent
Reddy Appireddygari Venkataramana et al.

(10) Patent No.: US 12,719,676 B2
(45) Date of Patent: Aug. 25, 2026

(54) ENHANCING DATA SECURITY THROUGH CONTEXTUAL ENCRYPTION AND LOSS IMPACT ASSESSMENT IN CLOUD ENVIRONMENT

(71) Applicant: Dell Products L.P., Round Rock, TX (US)

(72) Inventors: Mahesh Reddy Appireddygari Venkataramana, Bangalore (IN); Vinay Sawal, Fremont, CA (US); Avinash Kumar, Patna (IN)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 18/613,693

(22) Filed: Mar. 22, 2024

(65) Prior Publication Data

US 2025/0300828 A1 Sep. 25, 2025

(51) Int. Cl.
*H04L 9/14* (2006.01)
*G06F 21/62* (2013.01)

(52) U.S. Cl.
CPC ............ *H04L 9/14* (2013.01); *G06F 21/6245* (2013.01)

(58) Field of Classification Search
CPC ............................... H04L 9/14; G06F 21/6245
USPC ............................................................ 380/28
See application file for complete search history.

(56) References Cited

U.S. PATENT DOCUMENTS 6,598,161 B1 * 7/2003 Kluttz ................ G06F 21/6209 713/168
2003/0119484 A1 * 6/2003 Adachi ................ H04W 76/10 455/410
2020/0074091 A1 * 3/2020 Jain ....................... H04L 9/0894
2021/0234673 A1 * 7/2021 Kurian .................. H04L 9/3234

* cited by examiner

*Primary Examiner* — Jacob Lipman
(74) *Attorney, Agent, or Firm* — Workman Nydegger

(57) ABSTRACT

Techniques for granularly classifying and protecting data are disclosed. A service accesses data comprising a first data unit and a second data unit. Based on an analysis of the data, the service assigns the first data unit a first sensitivity level and the second data unit a second sensitivity level. The first sensitivity level is a relatively higher sensitivity level as compared to the second sensitivity level, resulting in the data, as a whole, comprising data with multiple disparate sensitivity levels. The service selects a first encryption algorithm for application against the first data unit and selects a second, different encryption algorithm for application against the second data unit. The service applies the first encryption algorithm to the first data unit and applies the second, different encryption algorithm against the second data unit, resulting in the data being subjected to multiple different encryption algorithms.

20 Claims, 7 Drawing Sheets

Data Categorization
400

ENHANCING DATA SECURITY THROUGH CONTEXTUAL ENCRYPTION AND LOSS IMPACT ASSESSMENT IN CLOUD ENVIRONMENT

COPYRIGHT AND MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

Embodiments of the present invention generally relate to intelligently categorizing data at a granular level. More particularly, at least some embodiments of the invention relate to systems, hardware, software, computer-readable media, and methods for determining a sensitivity level of data and for applying an encryption algorithm to the data based on its sensitivity level.

BACKGROUND

The phrase "data security" generally refers to the process of employing protective measures or actions to safeguard data against unauthorized access attempts. Data security also involves the preservation of data in a manner that maintains integrity, confidentiality, and availability.

Maintaining data security can involve various different actions. As some examples, data security may involve controlling user access to data, data masking, data encryption, data redaction, auditing, monitoring, and key management, among others.

It is often the case that one of the most valuable resources of an enterprise is that enterprise's data. Thus, it is often highly desirable to safeguard data from unauthorized access. If data is breached, it can result in significant, negative ramifications for the enterprise. Accordingly, there is a significant need to continually improve how data is made secure.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION

Figure 1:
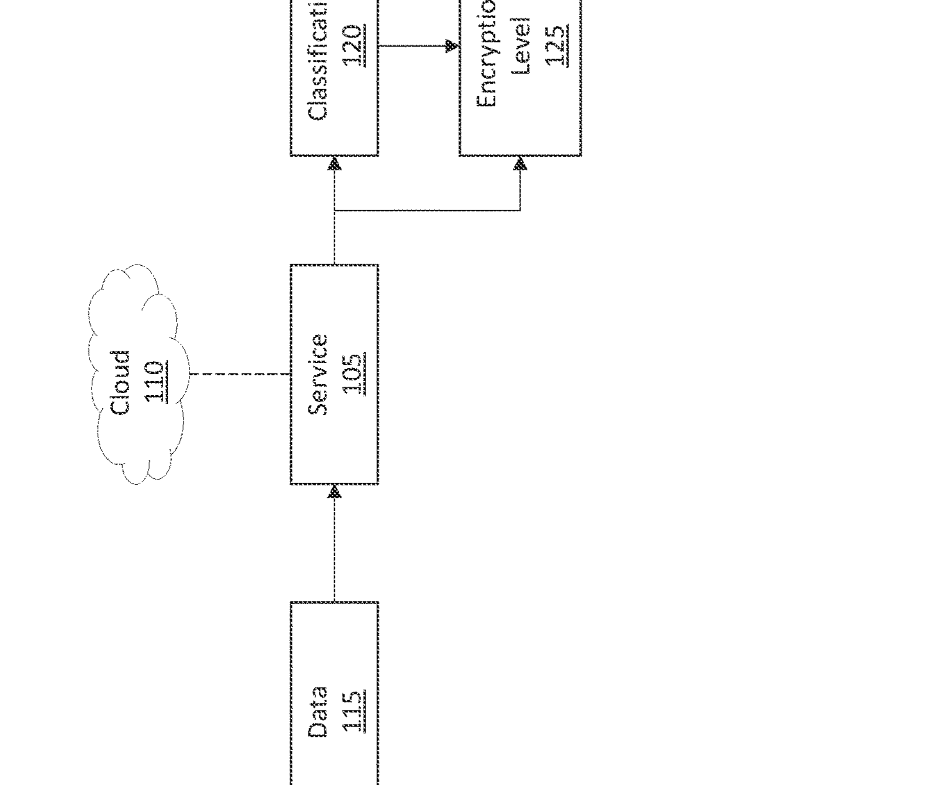
FIG. 1 illustrates an example computing architecture for granularly determining a sensitivity level of data and for applying an encryption algorithm to the data based on that data's sensitivity level.

The increasing use of modern data processing technologies has made data security a critical activity for data protection software. However, traditional data protection software faces many challenges, particularly in how those traditional techniques automatically analyze backup content and how they determine the appropriate level of encryption based on a data's sensitivity level. Stated differently, traditional data security techniques have failed to adequately, robustly, and efficiency secure sensitive data. Additionally, there is a gap in meeting enterprise compliance standards and supporting audits of critical data.

In typical backup scenarios, backup administrators create policies for diverse types of workloads based on security regulations and requirements. However, neither the backup application nor the administrator can fully analyze the sensitivity of the data being backed up. While the backup agent may classify objects under backup to some extent, the backup agent has historically lacked the intelligence to consider the content or the sensitivity level of the data. As a result, data classification or content awareness is limited to data types rather than sensitivity levels.

Consider, for example, a scenario involving two types of data, namely, hospital records (highly confidential) and a hospital conference's seating arrangement (not confidential or at least less confidential). In this situation, if a SQL database comprising those two types of data is backed up, it is typically the case that a uniform AES (advanced encryption standard) encryption is applied to both the hospital records and the employee seating arrangement details. Applying the same AES encryption to both the highly confidential data and the not-confidential/low-importance data leads to performance penalties due to the intensive computing performed for the low-importance data (e.g., the seating arrangement data).

Also, in some scenarios, AES encryption may not be sufficiently robust enough for extremely sensitive data, like the hospital records. Moreover, achieving compliance on AES-encrypted data becomes challenging, particularly for highly confidential departments, such as finance data that requires highly secure and auditable data.

In a cloud infrastructure or a virtualized infrastructure, not all virtual machines (VMs) or pods require data encryption. Often, it is desirable to prioritize encryption for specific data objects that are intended for backup so as to enable quick recovery or instant restore. Doing so ensures that the RTO (recovery time objective) for these data types is optimized.

As another example, consider an "Exchange" environment. In this environment, transaction logs are constantly being committed to the database, and the use of a uniform encryption algorithm for all data items can be inefficient and costly. These inefficiencies and costs arise because some data items, such as critical emails, legal documents, leave emails, maintenance reminders, and calendar invites, vary in their importance levels and their impact on the organization. Applying a strong and complex encryption algorithm to every data item, including non-critical ones, is resource-intensive and consumes excessive bandwidth.

Instead, as disclosed herein, it is more efficient to prioritize encryption efforts based on the criticality or sensitivity of the data. For example, if, out of 1,000 transactions, 600 are critical and 400 are non-critical, applying a complex encryption algorithm to the non-critical 400 logs results in unnecessary overhead in terms of operational costs and bandwidth. On the other hand, using a simple and generic encryption algorithm for all 1,000 logs puts the critical 600 logs at risk of being compromised, leading to potentially costly losses or higher impact for the end user. Additionally, if encryption is applied to these transactions, another factor to consider relates to the time taken to decrypt the data during the committing and truncation process. Otherwise, it could create a burden on the native host, as truncation is a native application activity.

Sensitive data that require encryption can fall into various categories. These categories include, but certainly are not limited to, corporate security, financial matters, and legal matters. Of course, other categories may exist, such as health records, personally identifiable information (PII), tax records, and so on. As some examples, corporate security may refer to sensitive financial details in emails or other data objects. Financial matters may refer to data objects, such as pay slips, that directly impact financial matters. Legal matters refer to confidential agreements or legal documents that are subject to litigation.

By identifying data that falls within any type of sensitive data category (e.g., any of those listed above or any other specified type of sensitive data category), organizations can apply appropriate encryption algorithms to ensure the security and protection of critical information. For instance, the encryption algorithm applied to financial matters may be highly robust and complex; whereas, encryption applied to a seating arrangement chart may be minimal.

Thus, traditional backup applications face several challenges in achieving robust data security. These challenges include a lack of content awareness and classification of sensitive data. The challenges further include an inadequate data security management to dynamically encrypt data based on its sensitivity, resulting in performance penalties, and compromising data security. The challenges further include an insufficient support for enterprise-wide security requirements, thereby hindering compliance-based data protection. These limitations highlight the need for advanced solutions that address these shortcomings and that provide improved data security features, particularly in cloud deployments or virtualized deployments.

To address the challenges mentioned above, the disclosed embodiments are directed to techniques for classifying data based on its sensitivity with respect to a particular entity (e.g., a business or enterprise or any other entity). This classification process involves grouping the data into distinct categories based on the data's determined impact or sensitivity levels. Once the data is classified, the embodiments offer the flexibility to select the appropriate level of encryption required by the business logic. By implementing this approach, the embodiments can beneficially overcome the limitations of traditional backup scenarios where data classification is primarily based on data types rather than sensitivity levels and where encryption techniques are applied in a broad, blanket-like manner.

Attention will now be directed to FIG. 1, which illustrates an example architecture 100 in which the disclosed principles may be employed. Architecture 100 shows a service 105.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service 105 to operate even when faced with a randomization factor.

As used herein, reference to any type of machine learning or artificial intelligence may include any type of machine learning algorithm or device, convolutional neural network (s), multilayer neural network(s), recursive neural network (s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a cloud service operating in a cloud environment 110. In some implementations, service 105 is a local service operating on a local device. In some implementations, service 105 is a hybrid service that includes a cloud component operating in the cloud and a local component operating on a local device. These two components can communicate with one another. In some cases, service 105 can operate in a virtualized environment, such as a virtual machine or a container. Thus, in some cases, service 105 operates in a cloud based environment and in other cases service 105 operates in a virtualized environment.

Service 105 is generally structured to receive data 115 and then determine a classification 120 for the data 115. The classification 120 reflects a confidentiality or sensitivity level for the data 115. Based on that classification 120, service can then select a corresponding encryption level 125 to be applied to the data 115. For instance, data having a relatively low level of confidentiality can be applied a relatively low complexity encryption technique. On the other hand, data having a relatively high level of confidentiality can be applied a relatively high complexity encryption technique. Thus, data 115 may include numerous different data units. Some of these data units may be highly confidential while others of these data units may be less confidential. The embodiments are able to analyze the data 115 to determine, at a granular level, how the various parts of data 115 should be classified. Based on these potentially multiple classifications/categories, the embodiments can facilitate the application of multiple encryption algorithms to the data, where the selection of those encryption algorithms is based on the determined classifications of the data 115.

As one example involving a backup scenario of a SQL database, service 105 can differentiate between hospital records and employee seating arrangement details. Instead of applying a uniform AES encryption against both of those two types of data, service 105 can apply distinct levels of encryption based on each individual data unit's sensitivity level. In this regard, the embodiments are able to granularly assign classification levels to data and then, based on those granular classifications, use corresponding encryption techniques that are designed to protect the data in accordance with their classification ratings.

By granularly assigning classifications, the embodiments beneficially ensure that extremely sensitive data, such as hospital records, receive stronger or more complex encryption measures while low-importance data receive less complex encryption (or perhaps no encryption), thereby incurring less performance impact. In this manner, the embodiments improve the efficiency and functionality of the computer system.

Similarly, in cloud infrastructure environments with virtualized deployments, service 105 allows for prioritizing encryption for specific data objects intended for backup. Doing so also helps to ensure optimization of the recovery time objective (RTO) for these restore types.

Former approaches for data security focused on applying strong encryption algorithms across the board without considering the specific characteristics and requirements of the data. This resulted in potential inefficiencies, as resources were allocated to encrypting data that may not have required such high-level security measures. Furthermore, it posed challenges in terms of performance and scalability, as encryption processes can be computationally intensive.

Additionally, the lack of data identification capabilities hindered the ability to differentiate between several types of data and apply appropriate security measures accordingly. Without precise knowledge of the sensitivity or importance of the data, it was difficult to determine the level of encryption necessary or to implement specific security protocols that align with regulatory requirements or business policies.

The disclosed techniques employ a dynamic encryption methodology that significantly improves performance compared to manual or historical efforts. Instead of applying encryption uniformly to all data, the system intelligently selects the data that requires encryption based on specific criteria. This dynamic approach avoids the unnecessary encryption of low-risk or non-sensitive data, resulting in improved efficiency and reduced computational overhead.

In some embodiments, service 105 can also incorporate an impact factor analysis method that evaluates the potential impact of data loss or exposure. This analysis helps classify the data into various categories based on their level of sensitivity and importance. By leveraging the impact factor analysis, service 105 can make informed decisions regarding which data should be selectively encrypted. This classification process enables organizations to focus their encryption efforts on the most critical and sensitive data, ensuring efficient resource allocation and effective protection.

The disclosed embodiments beneficially enhance the total customer experience by simultaneously lowering egress costs, lowering computational effort, and delivering robust security measures. Offering highly effective data security with minimized overhead for end users becomes a unique selling point for future-generation solutions, addressing the growing demand for enhanced security in the digital landscape.

Figure 2:
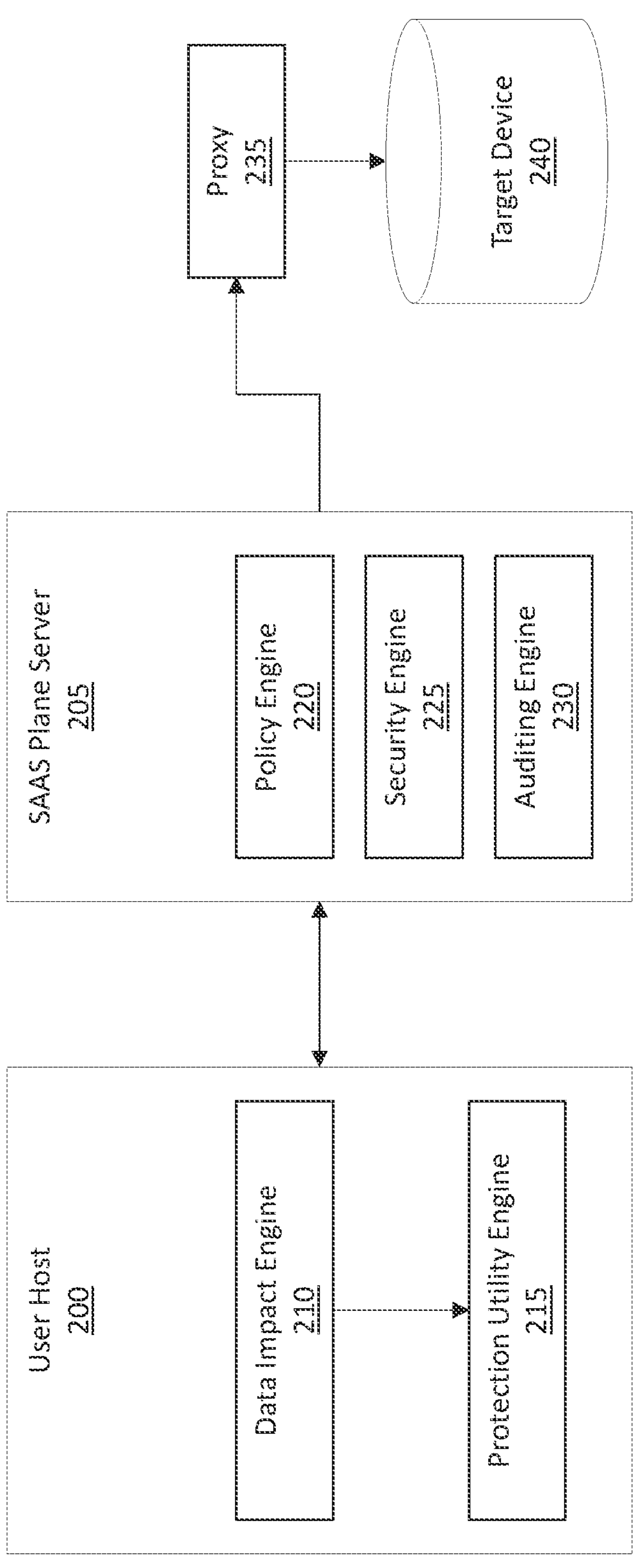
FIG. 2 illustrates further attributes of the disclosed architecture.

FIG. 2 provides some additional details regarding the disclosed computing architecture. As shown in FIG. 2, the disclosed system architecture consists of both a user host 200 and a server-side module (e.g., the SAAS plane server 205) working together to achieve the desired objectives. Service 105 from FIG. 1 can incorporate one, some, or all of the features illustrated in FIG. 2.

The user host 200 includes an impact analysis orchestration layer, as represented by the data impact engine 210. This layer incorporates an orchestration module responsible for utilizing an impact analysis and data grouping unit. The purpose of this unit is to classify the data based on its impact or sensitivity level. By analyzing various factors, such as the nature of the data, its importance, and potential risks, the system can group similar data into discrete categories. This classification process forms the basis for subsequent decision-making in the protection utility.

User host 200 further includes a protection utility advisor/broker layer, as represented by the protection utility engine 215. At the protection utility level, an advisor/broker layer comes into play. This layer leverages the classified results obtained from the orchestration layer. The advisor/broker uses this information to determine whether a particular data object is to be encrypted or left unencrypted. It takes into account factors like the sensitivity level, regulatory requirements, and business logic. For highly impacting or sensitive data, the system can employ a robust and strong encryption algorithm to ensure utmost security. On the other hand, for less impactful data, a lighter-weight encryption algorithm may be sufficient to strike a balance between security and performance.

The following paragraphs provide further details about the orchestration layer and the advisor/broker layer components.

Figure 3:
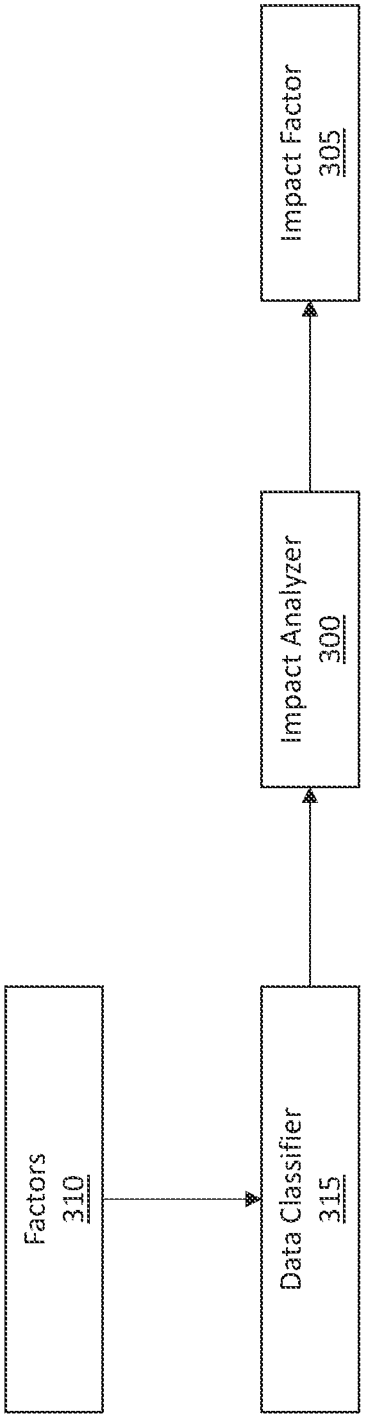
FIG. 3 illustrates how data can be classified/categorized.

FIG. 3 shows a loss impact analyzer 300, which can be included as a part of the data impact engine 210 of FIG. 2. The loss impact analyzer 300 is responsible for deriving a numeric count that represents the impact of data loss or exposure, as shown by impact factor 305. It takes numerous factors 310 (e.g., logs, events, objects, etc.) into consideration to determine the impact level or impact factor 305. These factors 310 are provided as input to the data classifier 315, which classifies the data and which then passes those classifications on to the impact analyzer 300. The data classifier 315 classifies the data by identifying the data types for the data. As one example, if the data corresponds to tax records, the data classifier 315 can recognize the data as being tax records and can apply a tag or classification label to that data. Additionally, the impact analyzer 300 can also assign a data tag or group to each classified object based on predefined policies set by the company's security standards.

For example, if the data is tagged as containing sensitive information such as credit card details or financial records, the impact factor is automatically increased. In cases where a company does not use data tags, the loss impact analyzer employs a natural language processing (NLP) driven numeric derivation algorithm. It scans the content for specific keywords or patterns using named-entity recognition (NER), named-entity linkage (NEL), etc. that indicate sensitive information and assigns a corresponding impact factor based on the findings.

For instance, identifying sensitive data (e.g., such as social security numbers or personally identifiable information) would result in a higher impact factor. Additionally, the loss impact analysis considers the data policies defined by administrators. These policies can hold a general tag for an entire content type, allowing end users to override the default behavior of the vendor application and specify their own impact assessment criteria. By combining these approaches, the loss impact analyzer determines a numeric count that quantifies the potential impact of data loss or exposure. This impact factor provides valuable information for subsequent decision-making processes in the system.

Figure 4:
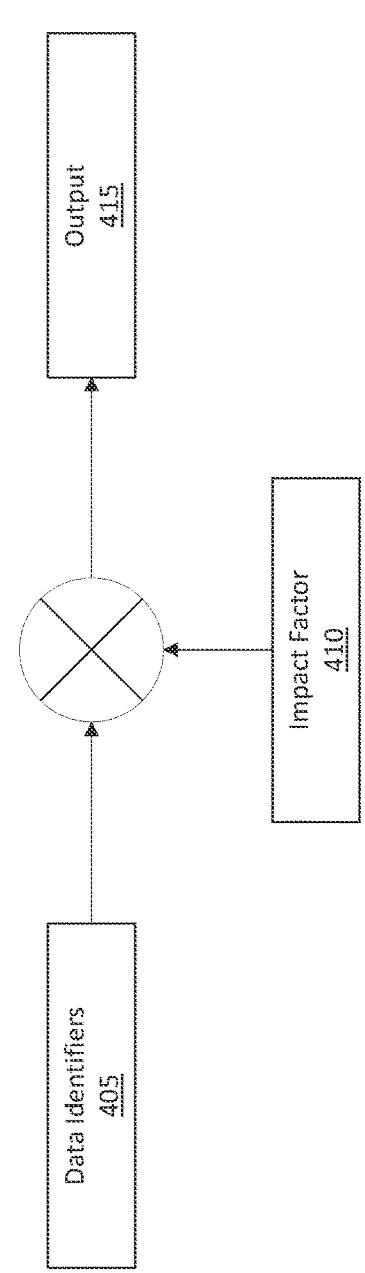
FIG. 4 further illustrates how data can be categorized.

FIG. 4 shows a data categorization operation 400, which involves data identifiers 405 (e.g., the data that has been categorized), the impact factor 410 (which corresponds to the impact factor 305 from FIG. 3), and the resulting output 415 (e.g., the data that has now been indexed and classified per the impact factor). Once the impact factor 410 is determined, the data categorization component (e.g., included within the data impact engine 210) groups items with similar impact levels to thereby produce the data identifiers 405. This process involves a combination of a comparator and object sorter to classify the data effectively.

The classification is based on the impact factor 410, ensuring that data is grouped accordingly before being sent to the protection utility.

Figure 5:
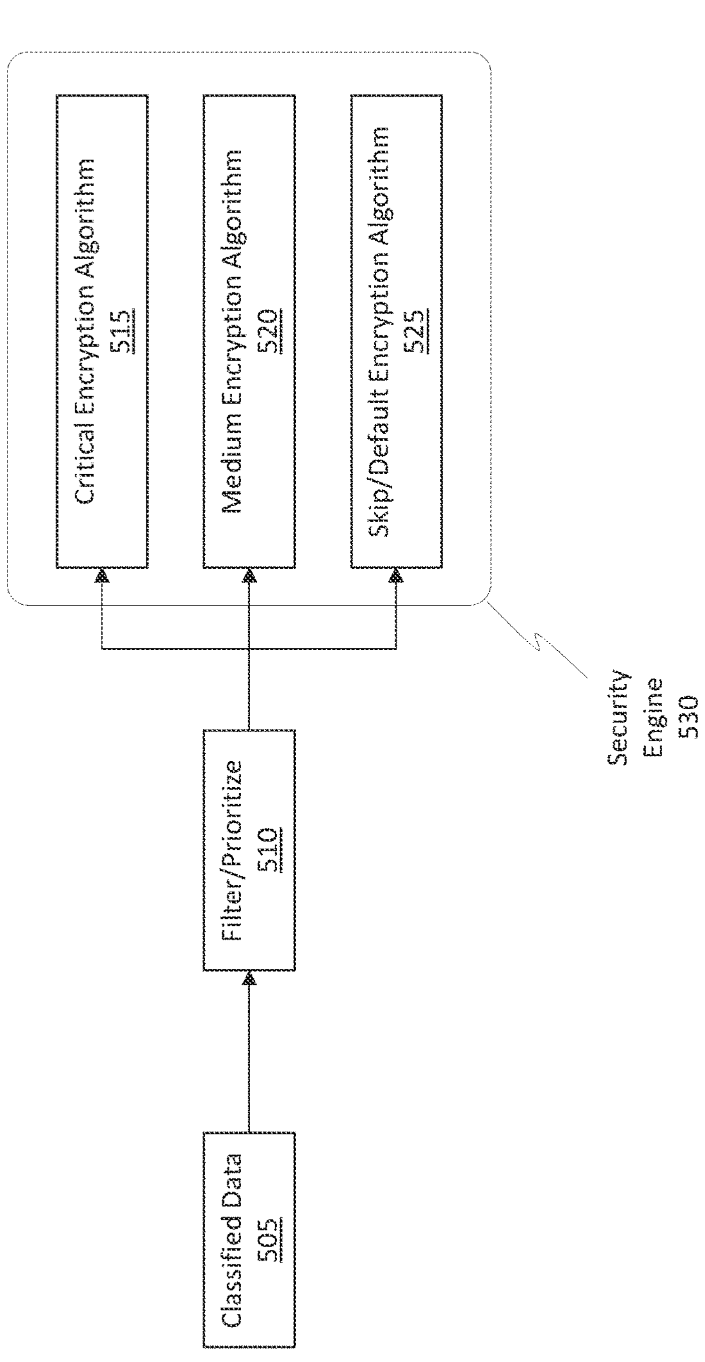
FIG. 5 illustrates how different encryption algorithms can be applied to the data after the data has been categorized.

The embodiments can also filter and prioritize data, as shown in FIG. 5 by filter and prioritize 500. The embodiments filter the incoming classified data 505 (e.g., the output 415 from FIG. 4) and prioritize it based on the impact analysis score, as shown by filter/prioritize 510. By applying filters and considering the impact factors, the embodiments can focus on data with higher impact levels, ensuring that these items receive appropriate attention and protection. The filter and prioritize operations can be performed by the protection utility engine 215. The protection utility engine 215 can also perform various encryptions and protection operations.

Returning briefly to FIG. 2, the SAAS plane server 205 is further shown as including a policy engine 220, a security engine 225, and an auditing engine 230. The policy engine 220 can determine whether any policy applies to the classified data. For instance, certain types of data may have policies associated with them, and the policies may dictate what level of security protection is to be applied to that type of data.

The security engine 225 is tasked with applying an encryption algorithm to the classified data. FIG. 5 is illustrative. FIG. 5 shows how the security engine 530 can assign various different types of encryption algorithms, including, but certainly not limited to a critical encryption algorithm 515, a medium encryption algorithm 520, or a skip/default encryption algorithm 525.

By way of further detail, the security engine 225 of FIG. 2 utilizes the prioritized data to determine the encryption technique to be applied. It selects an appropriate encryption method based on the impact analysis score. For highly impactful data, robust and strong encryption techniques are employed, providing enhanced security. On the other hand, for less impactful data, a lighter-weight encryption algorithm may be used, optimizing performance without compromising security. The security engine 225 encrypts the data and forwards it to the next module in the data protection pipeline, which may include the auditing engine 230. The auditing engine 230 can perform various checks or audits on the data to ensure it is protected in accordance with the specified policy. Optionally, the properly encrypted data can then be passed to a proxy 235 device and then perhaps to a target device 240.

By incorporating these components into the system architecture, the embodiments can effectively analyze and categorize data based on its loss impact. The prioritization and encryption of data are tailored to the impact levels, ensuring that appropriate security measures are applied. This approach provides a balance between security and performance, optimizing data protection in accordance with the organization's needs and policies.

Figure 6:
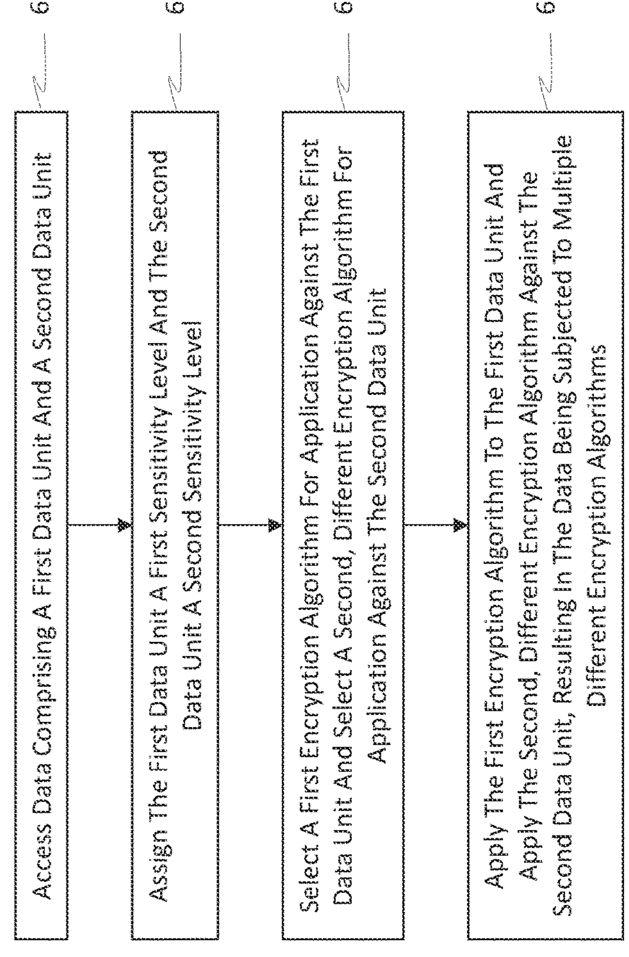
FIG. 6 illustrates a flowchart of an example method for categorizing data and for intelligently assigning an encryption algorithm to that data.

Attention will now be directed to FIG. 6, which illustrates a flowchart of an example method 600 for applying different sensitivity levels to data and for applying encryption algorithms based on those sensitivity levels or ratings. Method 600 can be performed within architecture 100 of FIG. 1. Method 600 can also be performed by service 105.

Method 600 includes an act (act 605) of accessing data comprising a first data unit and a second data unit. In some scenarios, the data includes database transaction data. Thus, in some scenarios, the first data unit and the second data unit are data describing database transactions.

Based on an analysis of the data, act 610 includes assigning the first data unit a first sensitivity level and the second data unit a second sensitivity level. The first sensitivity level is a relatively higher sensitivity level as compared to the second sensitivity level, resulting in the data, as a whole, comprising data with multiple disparate sensitivity levels. In some scenarios, the first sensitivity level is one of a high sensitivity level, a medium sensitivity level, or a low sensitivity level. Optionally, the second sensitivity level is a different one of the high sensitivity level, the medium sensitivity level, or the low sensitivity level. Of course, other sensitivity levels can be used, and these are just some examples.

In some implementations, the first data unit is assigned the first sensitivity level based on a determination that the first data unit is associated with one or more of the following: personally identifying information (PII), medical information associated with a human, a financial record, security information, or with legal information.

Act 615 includes selecting a first encryption algorithm for application against the first data unit and selecting a second, different encryption algorithm for application against the second data unit. In some scenarios, the first encryption algorithm is one of a critical encryption algorithm, a medium encryption algorithm, or a default encryption algorithm. The second encryption algorithm may be a different one of the critical encryption algorithm, the medium encryption algorithm, or the default encryption algorithm. Of course, other encryption algorithm types can be used. When reference is made to critical, medium, or default, those references refer to the complexity level of the encryption algorithm. For instance, the critical encryption algorithm is one that involves relatively more complex encryption techniques as compared to the other types of encryption algorithms.

Act 620 includes applying the first encryption algorithm to the first data unit and applying the second, different encryption algorithm against the second data unit, resulting in the data, as a whole, being subjected to multiple different encryption algorithms.

In some implementations, the above acts (e.g., accessing the data, analyzing the data, assigning the first and second sensitivity levels, selecting the first and second encryption algorithms, and applying the first and second encryption algorithms) are performed in a virtualized environment (e.g., a virtual machine or a container). In some implementations, those acts are performed in a cloud computing environment.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
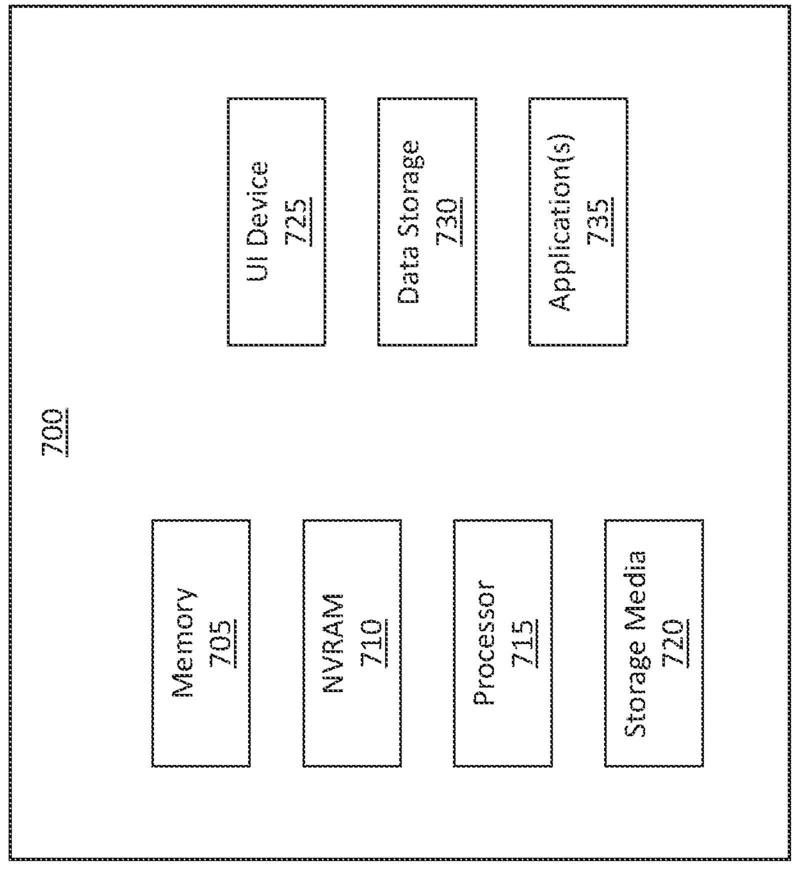
FIG. 7 illustrates an example computer system that can be configured to perform any of the disclosed operations.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. Also, where any of the aforementioned elements comprise or consist of a virtual machine (VM), that VM may constitute a virtualization of any combination of the physical components disclosed in FIG. 7.

In the example of FIG. 7, the physical computing device 700 includes a memory 705 which may include one, some, or all, of random access memory (RAM), non-volatile memory (NVM) 710 such as NVRAM for example, read-only memory (ROM), and persistent memory, one or more hardware processors 715, non-transitory storage media 720, UI device 725, and data storage 730. One or more of the memory 705 of the physical computing device 700 may take the form of solid-state device (SSD) storage. Also, one or more applications 735 may be provided that comprise instructions executable by one or more hardware processors 715 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The physical device 700 may also be representative of an edge system, a cloud-based system, a datacenter or portion thereof, or other system or entity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

accessing data comprising a first data unit and a second data unit;

prioritizing encryption for specific data that are intended for backup to enable quick recovery or instant restore and to optimize a recovery time objective (RTO);

determining that the data is one that is intended for backup, such that the data is prioritized for encryption;

based on an analysis of the data and based on the determination that the data is one intended for backup, assigning the first data unit a first sensitivity level and the second data unit a second sensitivity level, wherein the first sensitivity level is a relatively higher sensitivity level as compared to the second sensitivity level, resulting in the data, as a whole, comprising data with multiple disparate sensitivity levels;

selecting a first encryption algorithm for application against the first data unit and selecting a second, different encryption algorithm for application against the second data unit; and applying the first encryption algorithm to the first data unit and applying the second, different encryption algorithm against the second data unit, resulting in the data being subjected to multiple different encryption algorithms.

2. The method of claim 1, wherein the data includes database transaction data, and wherein the first data unit and the second data unit are data describing database transactions.

3. The method of claim 1, wherein the first data unit is assigned the first sensitivity level based on a determination that the first data unit is associated with personally identifying information (PII).

4. The method of claim 1, wherein the first data unit is assigned the first sensitivity level based on a determination that the first data unit is associated with medical information associated with a human.

5. The method of claim 1, wherein the first data unit is assigned the first sensitivity level based on a determination that the first data unit is associated with a financial record.

6. The method of claim 1, wherein the first data unit is assigned the first sensitivity level based on a determination that the first data unit is associated with security information.

7. The method of claim 1, wherein the first data unit is assigned the first sensitivity level based on a determination that the first data unit is associated with legal information.

8. The method of claim 1, wherein the first sensitivity level is one of a high sensitivity level, a medium sensitivity level, or a low sensitivity level.

9. The method of claim 8, wherein the second sensitivity level is a different one of the high sensitivity level, the medium sensitivity level, or the low sensitivity level.

10. The method of claim 1, wherein the first encryption algorithm is one of a critical encryption algorithm, a medium encryption algorithm, or a default encryption algorithm.

11. The method of claim 10, wherein the second encryption algorithm is a different one of the critical encryption algorithm, the medium encryption algorithm, or the default encryption algorithm.

12. A system comprising:
one or more processors; and
one or more hardware storage devices that store instructions that are executable by the one or more processors to cause the system to:
access data comprising a first data unit and a second data unit;
prioritize encryption for specific data that are intended for backup to enable quick recovery or instant restore and to optimize a recovery time objective (RTO);
determine that the data is one that is intended for backup, such that the data is prioritized for encryption;
based on an analysis of the data and based on the determination that the data is one intended for backup, assign the first data unit a first sensitivity level and the second data unit a second sensitivity level, wherein the first sensitivity level is a relatively higher sensitivity level as compared to the second sensitivity level, resulting in the data, as a whole, comprising data with multiple disparate sensitivity levels;
select a first encryption algorithm for application against the first data unit and select a second, different encryption algorithm for application against the second data unit; and
apply the first encryption algorithm to the first data unit and apply the second, different encryption algorithm against the second data unit, resulting in the data being subjected to multiple different encryption algorithms.

13. The system of claim 12, wherein the data includes database transaction data, and wherein the first data unit and the second data unit are data describing database transactions.

14. The system of claim 12, wherein the first sensitivity level is one of a high sensitivity level, a medium sensitivity level, or a low sensitivity level, and wherein the second sensitivity level is a different one of the high sensitivity level, the medium sensitivity level, or the low sensitivity level.

15. The system of claim 12, wherein the first encryption algorithm is one of a critical encryption algorithm, a medium encryption algorithm, or a default encryption algorithm, and wherein the second encryption algorithm is a different one of the critical encryption algorithm, the medium encryption algorithm, or the default encryption algorithm.

16. One or more hardware storage devices that store instructions that are executable by one or more processors to cause the one or more processors to:
access data comprising a first data unit and a second data unit;
prioritize encryption for specific data that are intended for backup to enable quick recovery or instant restore and to optimize a recovery time objective (RTO);
determine that the data is one that is intended for backup, such that the data is prioritized for encryption;
based on an analysis of the data and based on the determination that the data is one intended for backup, assign the first data unit a first sensitivity level and the second data unit a second sensitivity level, wherein the first sensitivity level is a relatively higher sensitivity level as compared to the second sensitivity level, resulting in the data, as a whole, comprising data with multiple disparate sensitivity levels;
select a first encryption algorithm for application against the first data unit and select a second, different encryption algorithm for application against the second data unit; and
apply the first encryption algorithm to the first data unit and apply the second, different encryption algorithm against the second data unit, resulting in the data being subjected to multiple different encryption algorithms.

17. The one or more hardware storage devices of claim 16, wherein the first encryption algorithm is one of a critical encryption algorithm, a medium encryption algorithm, or a default encryption algorithm, and wherein the second encryption algorithm is a different one of the critical encryption algorithm, the medium encryption algorithm, or the default encryption algorithm.

18. The one or more hardware storage devices of claim 16, wherein accessing the data, analyzing the data, assigning the first and second sensitivity levels, selecting the first and second encryption algorithms, and applying the first and second encryption algorithms are performed in a cloud computing environment.

19. The one or more hardware storage devices of claim 16, wherein accessing the data, analyzing the data, assigning the first and second sensitivity levels, selecting the first and second encryption algorithms, and applying the first and second encryption algorithms are performed in a virtualized environment.

20. The one or more hardware storage devices of claim 19, wherein the virtualized environment is one of a virtual machine or a container.

* * * * *